United States Patent
De Anda et al.

(10) Patent No.: US 10,183,341 B2
(45) Date of Patent: Jan. 22, 2019

(54) COMPOSITION HOLE PATTERN TRANSFER TOOLING

(71) Applicant: Sikorsky Aircraft Corporation, Stratford, CT (US)

(72) Inventors: Jose De Anda, San Francisco, CA (US); Sven Roy Lofstrom, Irving, TX (US); Eric Boyle, Haslet, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/971,598

(22) Filed: May 4, 2018

(65) Prior Publication Data

US 2018/0250754 A1    Sep. 6, 2018

Related U.S. Application Data

(62) Division of application No. 15/091,177, filed on Apr. 5, 2016, now Pat. No. 10,040,131.

(60) Provisional application No. 62/143,386, filed on Apr. 6, 2015.

(51) Int. Cl.
    *B23B 49/02* (2006.01)
(52) U.S. Cl.
    CPC ........ *B23B 49/023* (2013.01); *B23B 2215/04* (2013.01); *B23B 2247/12* (2013.01)
(58) Field of Classification Search
    CPC ... B23B 49/023; B23B 49/02; B23B 2247/12; B23B 2247/00; B23B 2215/04
    See application file for complete search history.

(56) References Cited

U.S. PATENT DOCUMENTS

| 3,981,786 | A | 9/1976 | Andrews |
| 4,740,117 | A * | 4/1988 | Schaff Deleury ....... B23B 49/02 408/115 B |
| 6,186,707 | B1 | 2/2001 | Kain |
| 7,627,940 | B2 * | 12/2009 | Amirehteshami ...... B23B 41/16 29/557 |
| 7,862,264 | B2 | 1/2011 | Sherlock et al. |
| 8,454,280 | B2 | 6/2013 | Dods et al. |
| 2005/0034586 | A1 | 2/2005 | Trisler, Jr. et al. |
| 2015/0063934 | A1 | 3/2015 | Matignon |
| 2016/0288218 | A1 | 10/2016 | De Anda et al. |

* cited by examiner

*Primary Examiner* — Alan Snyder
(74) *Attorney, Agent, or Firm* — Cantor Colburn LLP

(57) ABSTRACT

A system for transferring a hole pattern from a first component to a second component configured to couple to the first component is provided including a contour plate having a drill plate with a hole pattern substantially identical to the hole pattern of the first component. The position of the drill plate is adjustable to match the hole pattern of the drill plate with the hole pattern of the first component. A slidable fixture configured to support the second component is movable to align the second component with the drill plate such that the hole pattern of the drill plate in relation to the second component matches the hole pattern of the drill plate in relation to the hole pattern of the first component. The hole pattern of the drill plate is used to create a hole pattern in the second component matching the hole pattern of the first component.

5 Claims, 9 Drawing Sheets

COMPOSITION HOLE PATTERN TRANSFER TOOLING

CROSS-REFERENCE TO RELATED APPLICATIONS

This application is a divisional of U.S. Non-Provisional application Ser. No. 15/091,177, filed Apr. 5, 2016, which claims the benefit of U.S. Provisional Application Ser. No. 62/143,386, filed Apr. 6, 2015, both of which are incorporated herein by reference in their entirety.

BACKGROUND

The subject matter disclosed herein generally relates to a rotor blade of a rotary-wing aircraft, and more particularly, to a system and method for transferring a hole pattern to a laminate of a rotor blade.

Various components, such as a rotor blade of a rotary wing aircraft for example, have a plurality of holes grouped together in a hole pattern. Although the hole pattern on each rotor blade is substantially identical, the position of one or more of the holes of the pattern may vary slightly between rotor blades due to the allowable tolerances. In some instances, a component is mounted to the surface of the rotor blade adjacent the hole pattern. As a result, the hole pattern must be formed in both the component and the rotor blade. During initial manufacturing of the rotor blade, the hole pattern may be formed in the component and the rotor blade simultaneously such that alignment between the component and the rotor blade is not an issue.

However, over time, the component may wear and eventually need replacing. The hole pattern in the replacement component must maintain concentricity with the existing hole pattern of the blade. Because the hole pattern may vary slightly between individual rotor blades, it is insufficient to use a standard template to form the hole pattern. Therefore, there is a need to be able to easily transfer a hole pattern as measured from a rotor blade to a component configured to couple thereto.

BRIEF DESCRIPTION

According to one embodiment of the present disclosure, a system for transferring a hole pattern from a first component to a second component configured to couple to the first component is provided including a table having a track mounted thereon. A contour plate has a drill plate removably mounted thereto. The drill plate has a hole pattern substantially identical to the hole pattern of the first component. The position of the drill plate is adjustable to match the hole pattern of the drill plate with the hole pattern of the first component. A slidable fixture is configured to support the second component. The slidable fixture is mounted on the track and is movable between a plurality of positions to align the second component with the drill plate such that the hole pattern of the adjusted drill plate in relation to the second component matches the hole pattern of the adjust drill plate in relation to the hole pattern of the first component. Holes drilled in the hole pattern of the drill plate create a hole pattern in the second component which matches the hole pattern of the first component.

In addition to one or more of the features described above, or as an alternative, in further embodiments one or more holes of the hole pattern in the drill plate includes a lockable bushing which is adjustable in an unlocked mode, and is not adjustable in a locked mode.

In addition to one or more of the features described above, or as an alternative, in further embodiments the lockable bushing is a quackenbush bushing.

In addition to one or more of the features described above, or as an alternative, in further embodiments a first fixture is configured to receive and support the first component. When the first component is positioned within the first fixture, the hole pattern of the first component is configured to align with the hole pattern of the drill plate.

In addition to one or more of the features described above, or as an alternative, in further embodiments a second fixture is configured to receive and support the first component. The first fixture is configured to support the first component adjacent an inboard end and the second component is configured to support the first component adjacent an outboard end.

In addition to one or more of the features described above, or as an alternative, in further embodiments at least one of the first fixture and the second fixture is configured to translate about a vertical axis.

In addition to one or more of the features described above, or as an alternative, in further embodiments the first component is a rotor blade and the second component is a laminate.

In addition to one or more of the features described above, or as an alternative, in further embodiments at least one protrusion extending from the slidable fixture is used to align the second component relative to the slidable fixture.

In addition to one or more of the features described above, or as an alternative, in further embodiments the second component is coupled to the slidable fixture via one or more clamps.

In addition to one or more of the features described above, or as an alternative, in further embodiments a cooling system is configured to cool the slidable fixture as one or more holes are formed in the second component mounted thereto.

According to yet another embodiment of the present disclosure, a method of transferring a hole pattern from a first component to a second component configured to mount to the first component is provided including aligning the hole pattern of the first component with a hole pattern of a drill plate. At least one bushing associated with one or more holes of the hole pattern of the drill plate is locked in place. A second component mounted to a slidable fixture is aligned with the drill plate. Each of the plurality of holes of the hole pattern of the drill plate is formed in the second component.

In addition to one or more of the features described above, or as an alternative, in further embodiments aligning the hole pattern of the first component and the hole pattern of the drill plate includes inserting an alignment pin through each pair of corresponding holes.

In addition to one or more of the features described above, or as an alternative, in further embodiments aligning a second component with the drill plate includes aligning the second component with a primary datum defined between the hole pattern of the first component and the hole pattern of a drill plate.

In addition to one or more of the features described above, or as an alternative, in further embodiments the second component is properly located relative to the slidable fixture.

In addition to one or more of the features described above, or as an alternative, in further embodiments a drill complementary to the one or more lockable bushings is used to form each of the plurality of holes of the hole pattern in the second component.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

Figure 1:
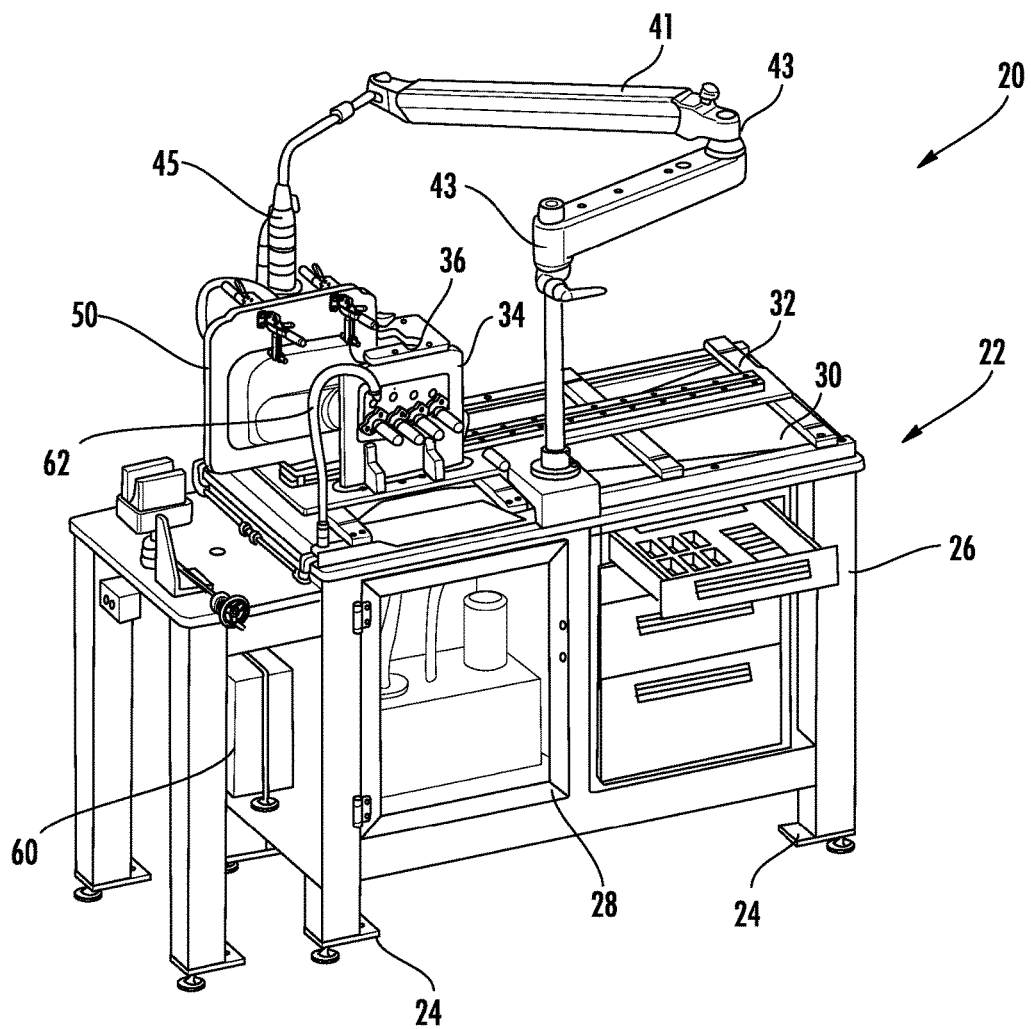
FIG. 1 is a perspective view of a system for transferring one or more holes from a first component to a second component according to an embodiment of the present disclosure.

The detailed description explains embodiments of the present disclosure, together with advantages and features, by way of example with reference to the drawings.

DETAILED DESCRIPTION

Referring now to the FIGS., a system 20 for forming one or more holes in a first component 74 is provided. The one or more formed holes of the first component 74 must align with a plurality of existing holes (not shown) in a second component 80. In the illustrated, non-limiting embodiment, the first component 74 is a laminate and the second component 80 is a rotor blade of a rotary wing aircraft. As shown, the system 20 includes a table 22 having a plurality of feet 24 configured to couple to a floor with one or more fasteners (not shown). The table 22 may additionally include one or more drawers 26 and cupboards 28 for storing additional parts related to use of the system 20. An upper surface 30 of the table 22 is arranged generally level to the floor, such as at an ergonomic height for example, and has a track 32 extending over at least a portion of a length of the table 22.

Figure 4:
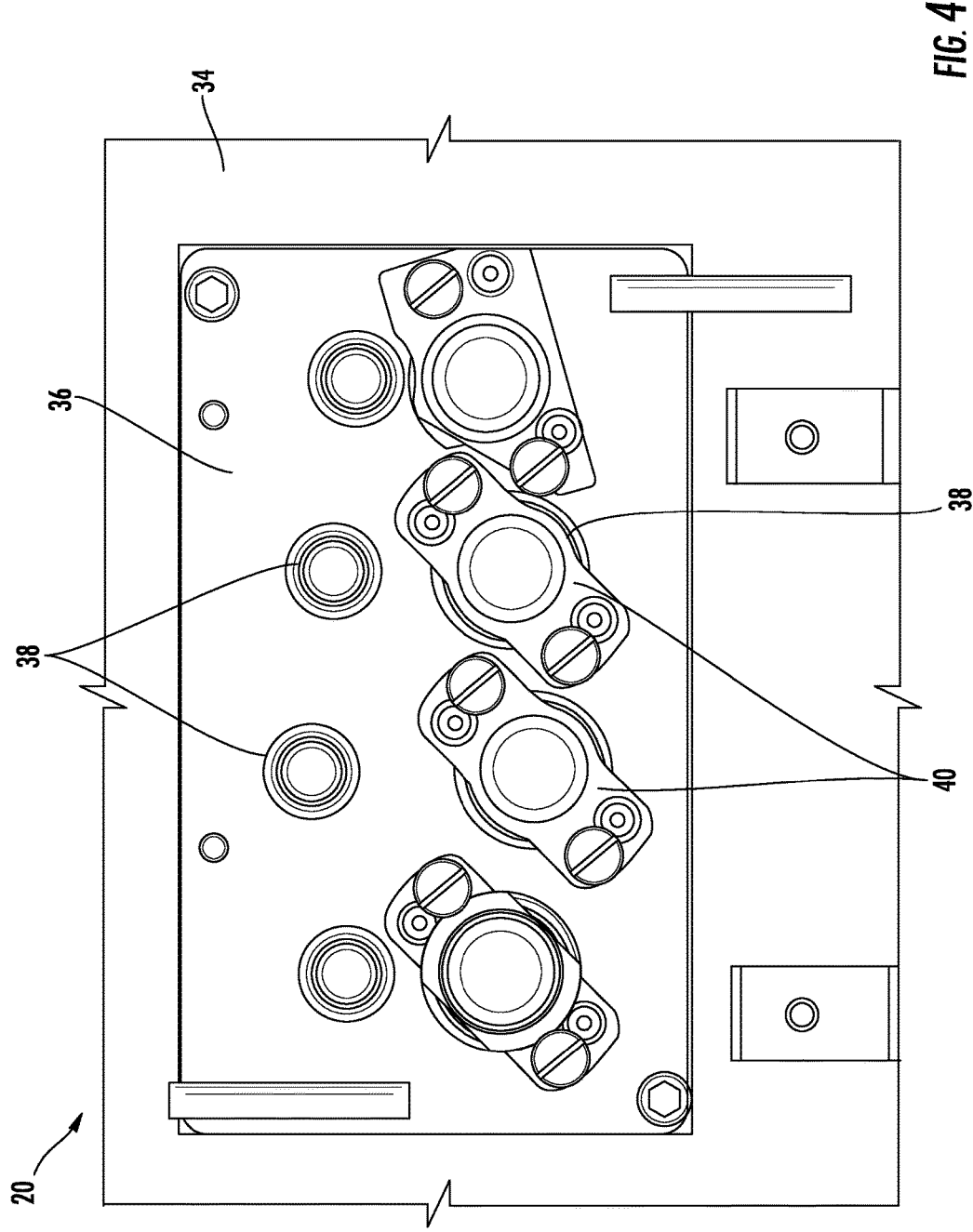
FIG. 4 is a front view of a drill plate mounted to a contour block of the system of FIG. 1 according to an embodiment of the present disclosure.

Mounted adjacent a portion of the track 32 is at least one contoured block 34 having a drill plate 36 removably coupled thereto. In the illustrated, non-limiting embodiment, two substantially identical and aligned contoured blocks 34 are arranged on opposing sides of the track 32. The contoured blocks 34 are positioned such that a slidable fixture 50, discussed in more detail below, may move freely along the track 32 without interference. Each drill plate 36, shown in more detail in FIG. 4, has a plurality of holes 38 formed therein in a pattern substantially identical to the plurality of holes (not shown) formed in a portion of the second component. As shown, the hole pattern of the drill plate 36 matches the hole pattern formed at the inboard end 82 of the rotor blade 80. In the illustrated, non-limiting embodiment, an adjustable bushing 40 is positioned in one or more of the plurality of holes 38 of the drill plate 36. In instances where the bushings 40 are quackenbush bushings, the drill plate 36 additionally includes adaptors for securing a Quackenbush drill to the drill plate 36. In one embodiment, best shown in FIG. 1, the system 20 additionally includes an arm 41 having one or more hinges or joints 43 and mounted to the table 22. The arm 41 may be configured to support the weight of a drill 45 used to securing the bushings 40 relative the drill plate 36 to improve the ergonomic efficiency of the system 20. However, it is understood that the arm 41 need not be used in all aspects of the present disclosure, or that other mechanisms can be used to provide ergonomic efficiencies.

Figure 2:
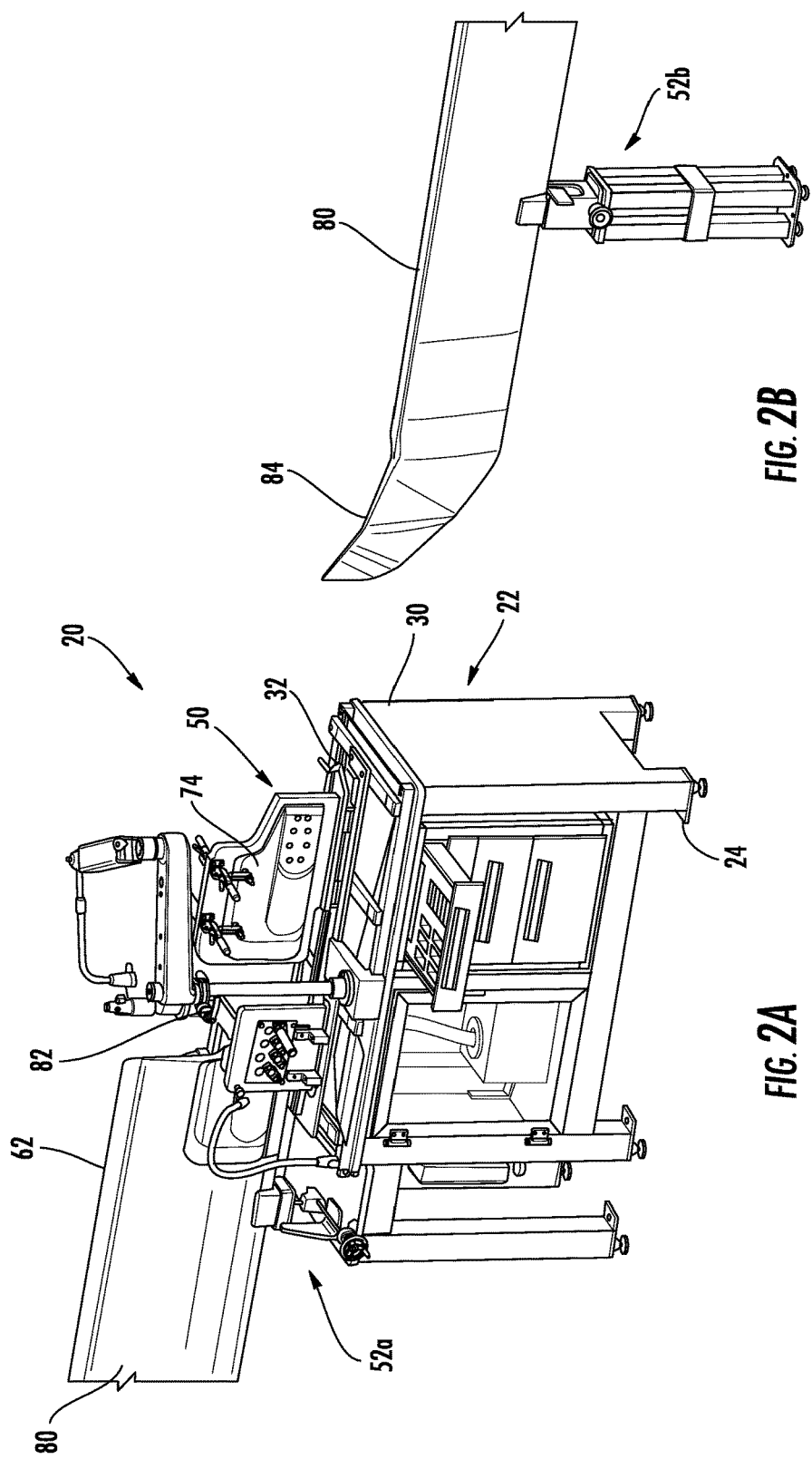
FIGS. 2a and 2b are perspective view of the fixtures of the system of FIG. 1 according to an embodiment of the present disclosure.
Figure 3:
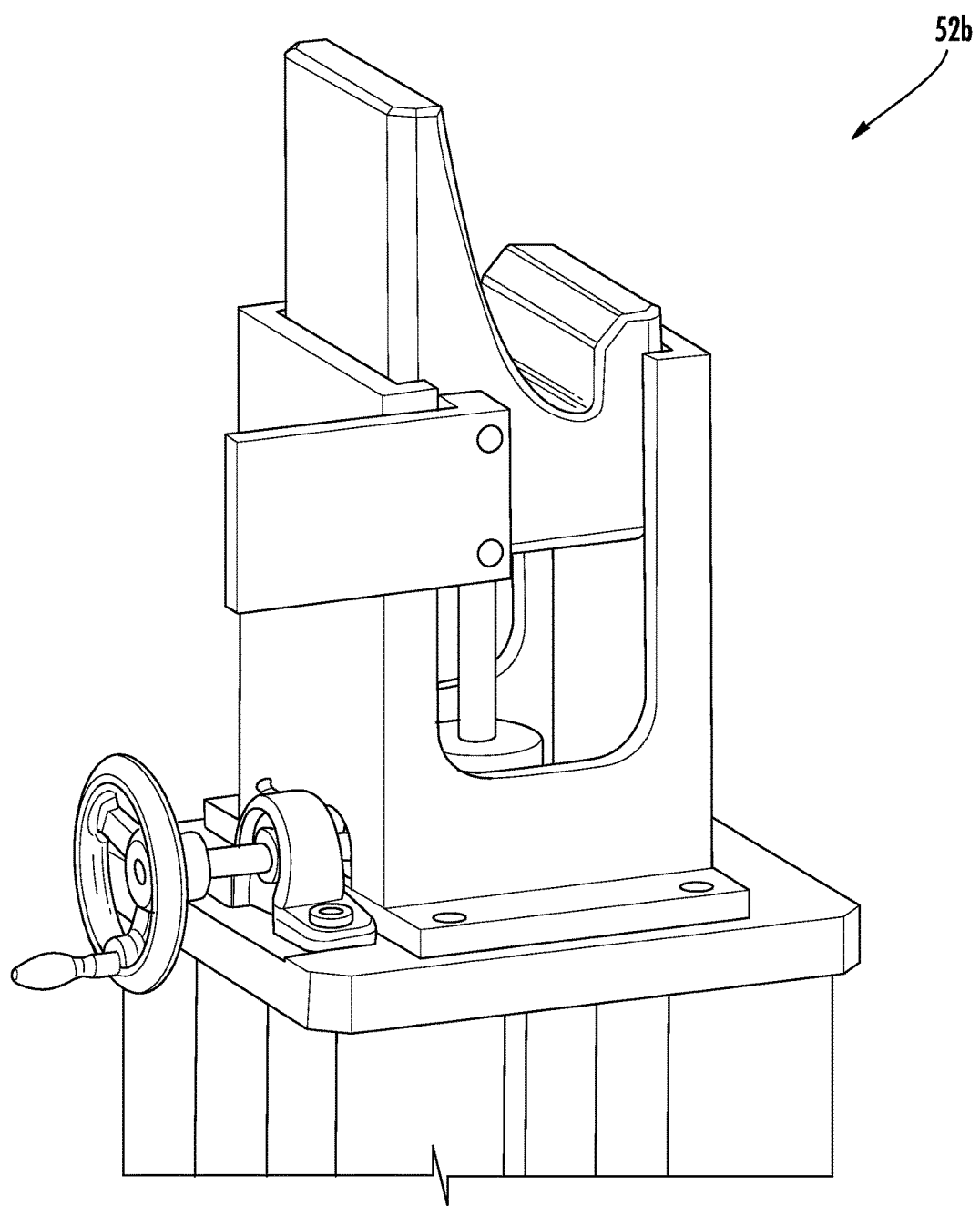
FIG. 3 is another perspective view of one of the fixtures of the system of FIG. 1 according to an embodiment of the present disclosure.

As previously suggested, at least one slidable fixture 50 is attached to the track 32 and is movable between multiple positions. The slidable fixture 50 is configured to support the first component 74 thereon. In the illustrated, non-limiting embodiment, the slidable fixture 50 has a shape complementary to the shape of the first component 74. The system 20 additionally includes one or more fixtures 52 configured to support the second component 80. A contour of each of fixture 52 is generally complementary to the portion of the second component 80 received therein. A first fixture 52a, as shown in FIG. 2a is mounted to an extended portion of the table 22. As shown, the first fixture 52a is configured to support the rotor blade 80 adjacent an inboard end 82 thereof. In the illustrated, non-limiting embodiment of FIG. 2b, a second fixture 52b is separated from the table 22 by a distance and is configured to receive an outboard end 84 of the rotor blade 80, such as near the blade tip as in the shown example although the present disclosure is not limited thereto. In addition, each of the fixtures 52 may be configured to telescope about a vertical axis, such that the second component 80, for example the rotor blade, is generally rotatable about an axis disposed at the inboard end 82 thereof. It is understood that, in other aspects, other numbers of fixtures could be used according to the need to support the piece 80.

A cooling system 60 includes one or more cooling nozzles 62 selectively operable to direct a cooling fluid, such as water or air for example, towards the one or more contoured blocks 34 and drilling plates 36. The cooling system 60 may be coupled to or integrally formed with the table 22.

Figure 9:
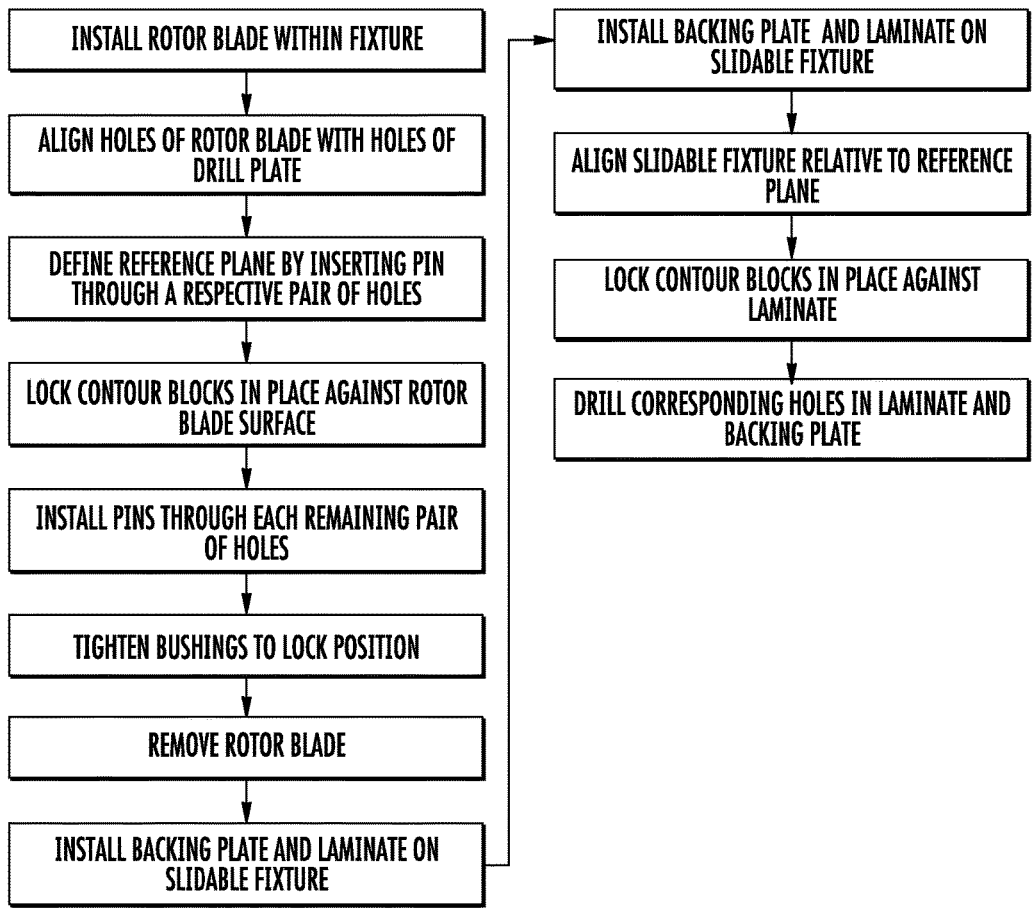
FIG. 9 is a method of operating the system 20 to transfer a pattern of one or more holes from a rotor blade to a laminate according to an embodiment of the present disclosure.

A method 100 of using system 20 to transfer a pattern of one or more holes (not shown) to the laminate 74 such that the plurality of holes align with the holes (not shown) of the inboard end 82 of the rotor blade 80 is provided in more detail in FIG. 9. For example, the rotor blade 80 is mounted to the system 20 by positioning a portion of the rotor blade 80, near the inboard end 82, within the first fixture 52a and a portion of the rotor blade 80, near the outboard end 84, within the second fixture 52b. When installed, the inboard end 82 of the rotor blade 80 is generally aligned with the contour blocks 34 mounted to surface 30 of the table 22.

Figure 5:
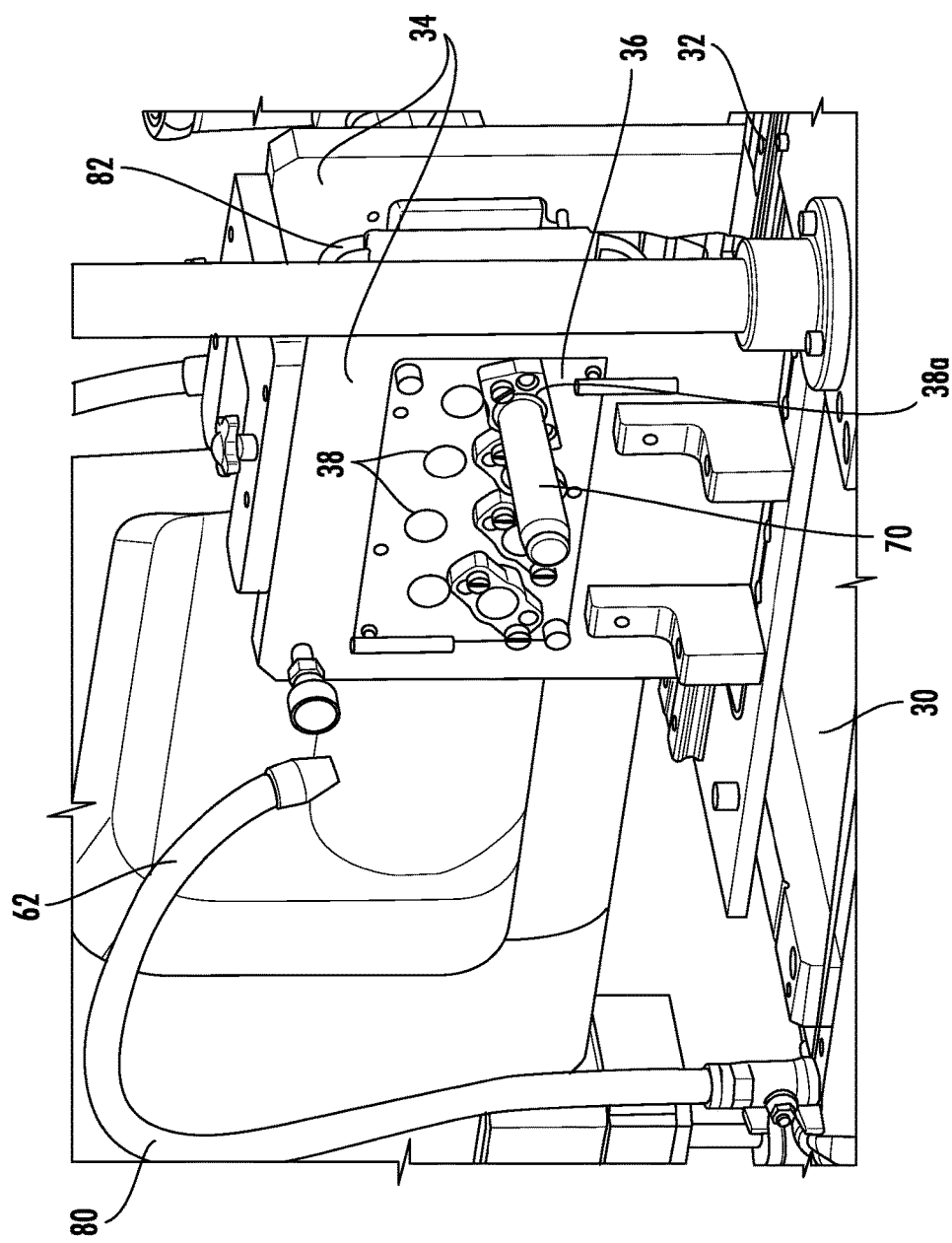
FIG. 5 is a perspective view of the system of FIG. 1 while patterning the holes to be transferred according to an embodiment of the present disclosure.

The fixtures 52 and/or the contoured blocks 34 may be adjusted to generally align the holes (not shown) of the inboard end 82 of the rotor blade 80 with the holes 38 formed in the one or more drill plates 36. A stepped alignment pin 70 is then inserted through one of the plurality of blade holes 38 on a first drill plate 36 and a corresponding hole (not shown) formed in the rotor blade 80. In the illustrated, non-limiting embodiment, the pin 70 is inserted into the inboard leading edge hole 38a (FIG. 5). Together the pin 70 and the aligned holes 38 through which the pin 70 extends define a primary datum or reference plane.

Figure 6:
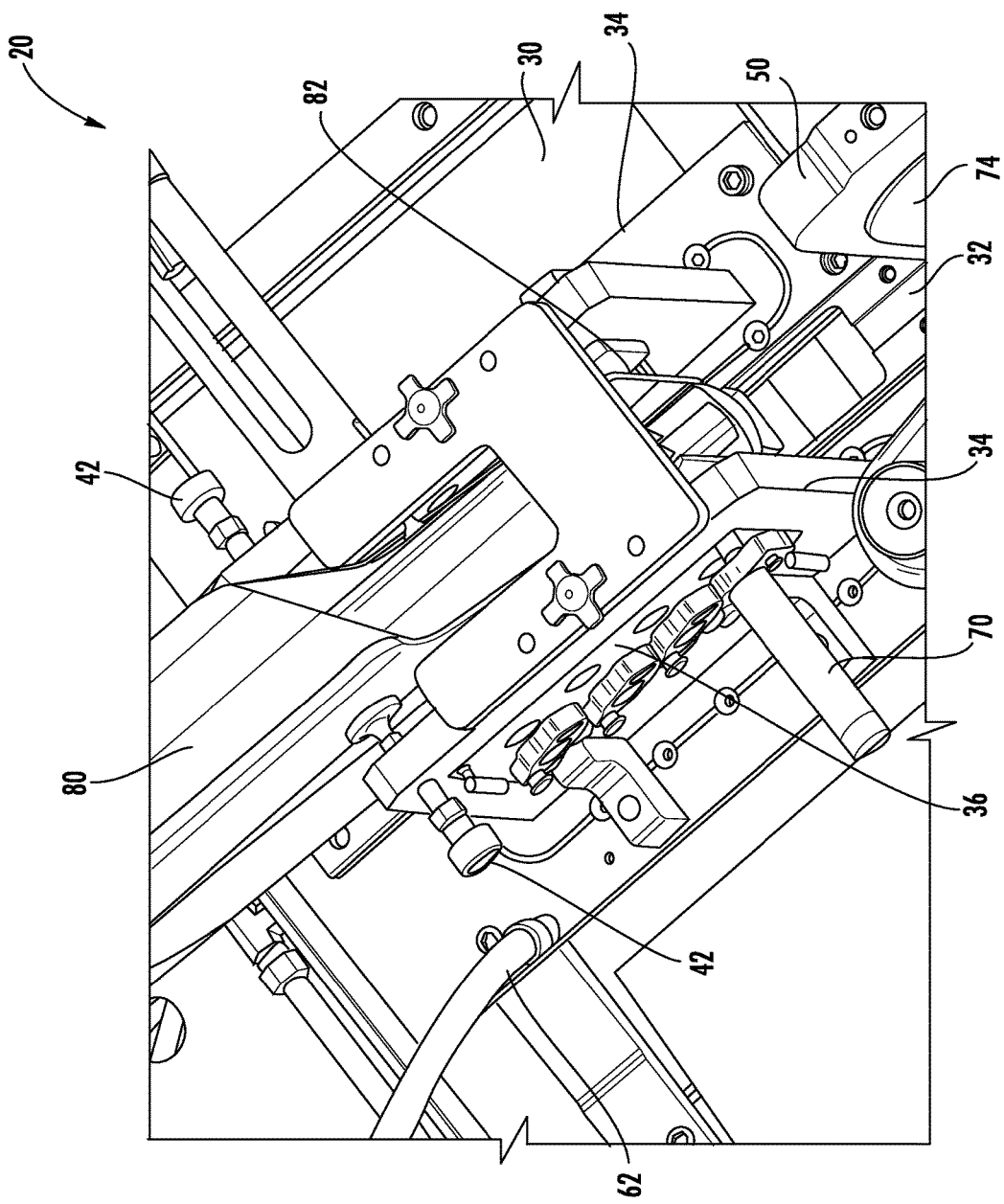
FIG. 6 is another perspective view of the system of FIG. 1 while patterning the holes to be transferred according to an embodiment of the present disclosure.

After identifying one or more datums, the blade 80 is locked into place relative to the system 20 by tightening the one or more contour blocks 34 against the adjacent surface of the rotor blade 80, such as with one or more push pads 42 for example (FIG. 6). In one embodiment, the portion of the contour block 34 configured to contact the rotor blade 80 includes a protective material or coating to prevent damage to the rotor blade. The remaining holes 38 of the drill plate 36 are then aligned with the corresponding holes formed in the rotor blade 80 by installing pins 70 through each pair, respectively. Once all of the holes 38 in the drill plate 36 and the rotor blade 80 are aligned, each adjustable bushing 40 of the drill plate 38 is locked into a corresponding position. By applying a specific torque value to the bushings 40, the bushings 40 will not move relative to the drill plate 38, such as during a later drilling operation for example. The rotor blade 80 is then removed from the fixtures 52.

Figure 7:
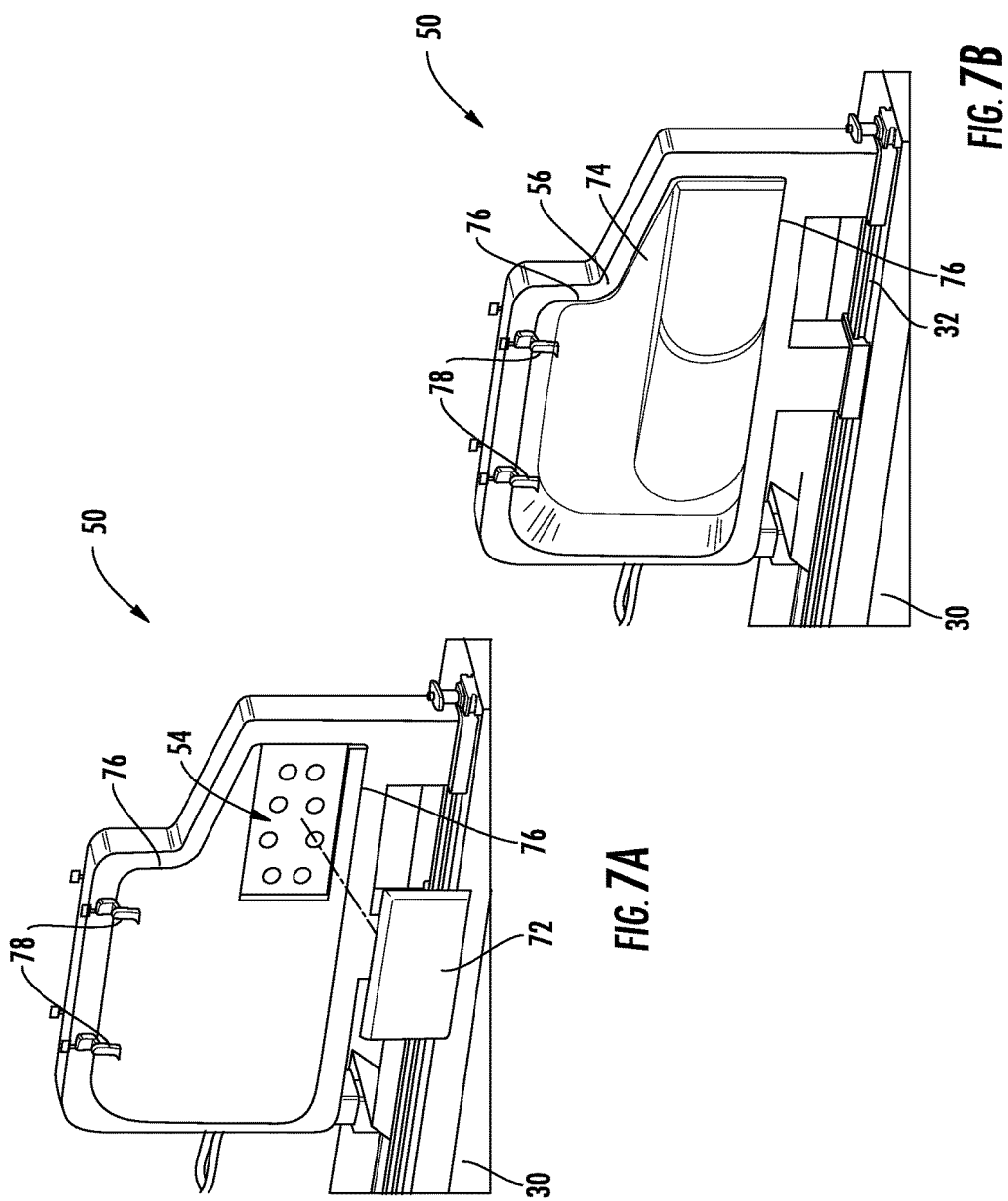
FIGS. 7a and 7b are perspective views of a slidable fixture configured to receive a component to which the pattern is transferred according to an embodiment of the present disclosure.
Figure 8:
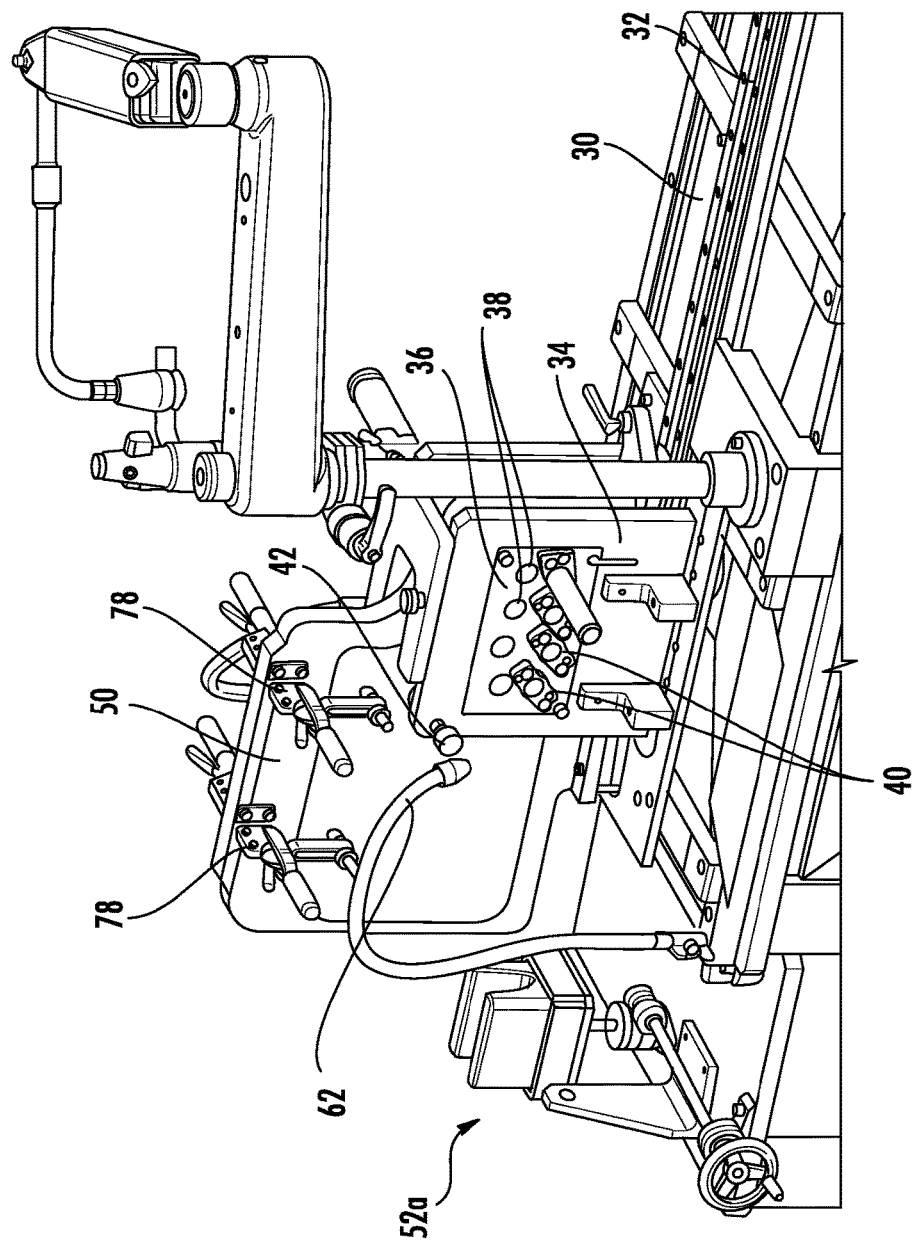
FIG. 8 is a perspective view of the system of FIG. 1 while transferring the patterned holes to component according to an embodiment of the present disclosure.

With respect to FIGS. 7-8, a backing plate 72, such as formed from aluminum or another suitable material for example, is installed in the region of the drill hole pattern 54 of the slidable fixture 50. A laminate 74 is then installed over the backing plate 72. In one embodiment, a plurality of tabs or protrusions 76 extends outwardly from a surface 56 of the fixture 50. Each of the plurality of tabs 76 defines a datum used to properly locate the laminate 74 relative to the fixture 50. Once the laminate 74 is in the defined position, one or more clamps 78 retain the laminate 74 in position relative to the fixture 50.

The slidable fixture 50 is then moved to a fixed position adjacent the one or more contour plates 34 such that the laminate 74 is located in a nominal position with respect to the primary datum defined by the inboard leading edge hole 38a. Once properly located, the one or more contour blocks 34 are secured to the laminate 74 and the fixture 50 via the one or more push pads 42. Corresponding holes are then drilled through the laminate 74 and backing plate 72. In one embodiment, the cooling system 60 provides a cooling flow during the drilling operation to prevent damage and warping due to overheating of the laminate 74. The system may be used to pattern the holes arranged at any location, not just the inboard end 82, of the rotor blade 80. In addition, although described herein relative to a laminate 74 for a rotor blade 80, the system 20 and method may be adapted to form complementary and aligned holes in any component.

The system 20 described herein can accurately locate the position of an existing hole pattern of a component, such as a rotor blade 80. By locking movable drill bushings 40 in a position corresponding to the hole pattern, the pattern may be easily transferred to another component. In addition, the system 20 allows for use of a specialized drill configured to drill thick composite laminate in a more cost effect manner than conventional processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. By way of example, aspects can be used in wind turbines, propellers used on fixed wing aircraft, or in the repair of any piece where holes need to be drilled in specific locations. Accordingly, the present disclosure is not to be seen as limited by the foregoing description, but is only limited by the scope of the appended claims.

What is claimed is:

1. A method of transferring a hole pattern from a first component to a second component which is configured to mount to the first component, comprising:
   aligning the hole pattern of the first component with a hole pattern of a drill plate;
   locking at least one bushing in place, the at least one bushing being associated with one or more holes of the hole pattern in the drill plate;
   aligning a second component mounted to a slidable fixture with the drill plate;
   and forming each of at least one hole of the hole pattern of the drill plate in the second component.

2. The method of claim 1, wherein aligning the hole pattern of the first component and the hole pattern of the drill plate includes inserting an alignment pin through each pair of aligned holes.

3. The method according to claim 1, wherein aligning a second component with the drill plate includes aligning the second component with a primary datum defined between the hole pattern of the first component and the hole pattern of the drill plate.

4. The method according to claim 1, further comprising locating the second component relative to the slidable fixture in a predetermined orientation.

5. The method according to claim 1, wherein a drill complementary to the at least one bushing is used to form each of the at least one holes of the hole pattern of the first component in the second component.

* * * * *

UNITED STATES PATENT AND TRADEMARK OFFICE
CERTIFICATE OF CORRECTION

PATENT NO. : 10,183,341 B2
APPLICATION NO. : 15/971598
DATED : January 22, 2019
INVENTOR(S) : De Anda et al.

It is certified that error appears in the above-identified patent and that said Letters Patent is hereby corrected as shown below:

On the Title Page

Item (72) Inventor is corrected to read:
-- Jose De Anda, Fort Worth, TX;
Sven Roy Lofstrom, Irving, TX;
Eric Boyle, Haslet, TX;
Frank M. Caputo, Cheshire, CT --.

Signed and Sealed this
Eighteenth Day of June, 2019

Andrei Iancu
*Director of the United States Patent and Trademark Office*